US008779712B2

United States Patent
Tanabe et al.

(10) Patent No.: US 8,779,712 B2
(45) Date of Patent: Jul. 15, 2014

(54) MOTOR CONTROL DEVICE

(75) Inventors: Akira Tanabe, Tokyo (JP); Hiroyuki Sekiguchi, Tokyo (JP); Hidetoshi Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 13/695,738

(22) PCT Filed: Apr. 28, 2011

(86) PCT No.: PCT/JP2011/060421
§ 371 (c)(1),
(2), (4) Date: Nov. 1, 2012

(87) PCT Pub. No.: WO2011/145451
PCT Pub. Date: Nov. 24, 2011

(65) Prior Publication Data
US 2013/0057186 A1   Mar. 7, 2013

(30) Foreign Application Priority Data

May 20, 2010   (JP) ................................. 2010-116071

(51) Int. Cl.
*H02P 7/00*    (2006.01)
(52) U.S. Cl.
USPC ................. 318/432; 318/400.07; 318/400.14; 318/400.15; 318/430; 318/434
(58) Field of Classification Search
USPC ............. 318/400.01, 400.07, 400.14, 400.15, 318/721, 727, 799, 801, 823, 430, 432, 434, 318/437; 388/800, 805, 813, 902, 923
See application file for complete search history.

(56) References Cited

U.S. PATENT DOCUMENTS 5,469,215 A * 11/1995 Nashiki .................. 318/432

FOREIGN PATENT DOCUMENTS

| JP | 2002 44974 | 2/2002 |
| JP | 2004 32944 | 1/2004 |
| JP | 2004 282888 | 10/2004 |
| JP | 2008 503 | 1/2008 |
| JP | 4144018 | 9/2008 |
| JP | 2009 118684 | 5/2009 |
| JP | 2010 63343 | 3/2010 |

OTHER PUBLICATIONS

Kumazaki, F., "Method of Compensation for Cogging Torque of Brushless DC Servo Motor," Mitsubishi Electric Corporation, pp. 4-297 to 4298, (1998) (with partial English translation).

(Continued)

*Primary Examiner* — Antony M Paul
(74) *Attorney, Agent, or Firm* — Oblon, Spivak, McClelland, Maier & Neustadt, L.L.P.

(57) ABSTRACT

A motor control device including: a following control unit that calculates a pre-correction torque command based on a difference between an operation command signal for commanding an operation of a motor and a detection signal resulting from detecting an operation of the motor; an adder that outputs a post-correction torque command by adding the pre-correction torque command to a correction torque command; and an electric-current control unit that outputs a drive current driving the motor based on the post-correction torque command, wherein the motor control device executes control so that the detection signal matches the operation command signal, and further including: a reference-periodic-signal computation unit; an amplitude/phase estimation unit; and a correction-torque computation unit, so that the correction torque command is updated such that a difference between the correction torque command and the post-correction torque command becomes smaller.

8 Claims, 8 Drawing Sheets

(56) References Cited

OTHER PUBLICATIONS

International Search Report Issued Aug. 2, 2011 in PCT/JP11/060421 Filed Apr. 28, 2011.

Office Action issued Aug. 13, 2013, in Japanese Patent Application No. 2012-515809 (with English-language translation).
Office Action issued Aug. 26, 2013, in Taiwanese Patent Application No. 100116801 (with English-language translation).

* cited by examiner

MOTOR CONTROL DEVICE

FIELD

The present invention relates to a motor control device that drives an industrial machine such as a machining tool.

BACKGROUND

It is known that, in a device that controls a motor that drives an industrial machine, torque pulsation is caused depending on a rotational position (a rotation angle) of a motor according to the characteristics thereof, and the torque pulsation is called "torque ripple".

For example, in a permanent-magnetic synchronous motor, a cogging torque is caused due to distortion of magnetic-flux changes inside the motor, and the number of times of pulsations (also referred to as "the number of peaks") determined by the configuration of the motor (the number of poles or slots) for one rotation thereof (also referred to as "mechanical angle") are caused. Such a torque ripple sometimes causes a negative influence on operations of the machine, and therefore there has been proposed a method for suppressing the torque ripple by a control device.

As a control device that suppresses a torque ripple, there has been known a device that offsets a torque ripple by a correction torque command given at an equal angular period according to a rotational position in consideration of the torque ripple occurring periodically depending on the rotational position. An amplitude and a phase of the caused torque ripple are different for each motor depending on variations and the like generated during manufacturing of motors, and therefore it is necessary to also set an amplitude and a phase of the correction torque command for each motor.

As described above, as a control device that suppresses a torque ripple by determining an amplitude and a phase of a correction torque command for each motor, for example, the following techniques have been proposed. That is, there has been disclosed a technique including a step of changing a phase of a correction torque command indicating a sine wave over the whole range (0 to 360 degrees) at a predetermined pitch width, and a subsequent step of changing the amplitude of the correction torque command at a predetermined pitch width, by which a magnitude of the torque ripple is analyzed by an FFT computation unit every time the phase and the amplitude of the correction torque ripple are changed, thus determining the amplitude and the phase of the correction torque command that minimize the torque ripple (see, for example, Patent Literature 1).

Further, there has been disclosed a technique in which a sampling unit that samples, under a set condition, a post-correction torque command that is a signal to which the correction torque command has been added, an FFT computation unit that calculates a Fourier coefficient by an FFT computation, and a correction-value computation unit that performs computations on a correction value based on the Fourier coefficient, are provided, and a step of sampling performed by the sampling unit and a step of determining the Fourier coefficient of the sampled post-correction torque command and updating the correction torque command are performed for a set number of repetitions, thereby calculating a torque-ripple correction value (see, for example, Patent Literature 2).

CITATION LIST

Patent Literatures

Patent Literature 1: Japanese Patent No. 4144018
Patent Literature 2: Japanese Patent Application Laid-open No. 2010-63343

SUMMARY

Technical Problem

However, according to the conventional techniques described above, for example, in the technique disclosed in Patent Literature 1, the amplitude and the phase of the correction torque command need to be searched at different steps. Furthermore, particularly the phase needs to be searched over the whole range. Therefore, there is a problem that it takes a long time for adjustment work and that processing involved in the adjustment is increased.

Further, in the technique disclosed in Patent Literature 1, the search is performed with a predetermined pitch width, and therefore there is a problem that a trade-off relationship is established between the time required for the adjustment work and final adjustment accuracy, and that it is difficult to achieve reduction in the adjustment time and high accuracy at the same time.

In the technique disclosed in Patent Literature 2, the step of sampling the post-correction torque command and the step of calculating the Fourier coefficient by an FFT computation and updating the correction torque command need to be performed repetitively. Particularly, it is necessary to determine the amplitude and the phase of the torque ripple dependent on a rotational position (a rotation angle) of the motor.

However, usual data sampling is performed at a regular interval, and therefore the FFT computation needs to be performed such that the sampled data and the angle of the motor are associated with each other, which makes off-line data processing essential. Accordingly, there is a problem that the adjustment work requires a lot of time and that the processing involved in the adjustment is increased.

Furthermore, in the technique disclosed in Patent Literature 2, it is necessary to sample the number of data items required to perform satisfactory analysis according to a frequency of the torque ripple, and therefore there is a problem that a large-scale memory is required.

The present invention has been achieved in view of the above problems, and an object of the present invention is to provide a motor control device that estimates a correction torque command for suppressing a torque ripple by a simpler process in a short time with high accuracy.

Solution to Problem

In order to solve the aforementioned problems, a motor control device according to one aspect of the present invention is configured to include: a following control unit that calculates a pre-correction torque command based on a difference between an operation command signal for commanding an operation of a motor and a detection signal that is a result of detecting an operation of the motor; an adder that outputs a post-correction torque command by adding the pre-correction torque command to a correction torque command; and an electric-current control unit that outputs a drive current for driving the motor based on the post-correction torque command, wherein the motor control device executes control so that the detection signal matches the operation command signal, and wherein the motor control device further includes: a reference-periodic-signal computation unit that calculates a reference periodic signal with a period that is same as that of a torque ripple caused by the motor and that is dependent on a position of the motor based on the detection signal; an amplitude/phase estimation unit that sequentially estimates an amplitude of the post-correction torque command and a phase of the post-correction torque command relative to the reference periodic signal based on the reference periodic signal and the post-correction torque command that is an output from the adder; and a correction-torque computation unit that sequentially updates the correction torque command input to the adder so that a difference between the correction torque command input to the adder and the post-correction torque command output from the adder becomes small, by using an amplitude and a phase of the post-correction torque command that are estimated by the amplitude/phase estimation unit.

Advantageous Effects of Invention

According to the present invention, an amplitude and a phase of a correction torque command can be updated respectively based on a result of sequentially estimating an amplitude and a phase of a pre-correction torque command or a post-correction torque command, so that it is not necessary to determine the amplitude and the phase at different steps, and that the correction torque command for suppressing a torque ripple can be determined by a simple process in a short time. Furthermore, an FFT computation involved in sampling does not need to be performed repetitively, so that the correction torque command can be determined by a simple process in a short time.

DESCRIPTION OF EMBODIMENTS

Exemplary embodiments of a motor control device according to the present invention will be explained below in detail with reference to the accompanying drawings. The present invention is not limited to the embodiments.

First Embodiment

Figure 1:
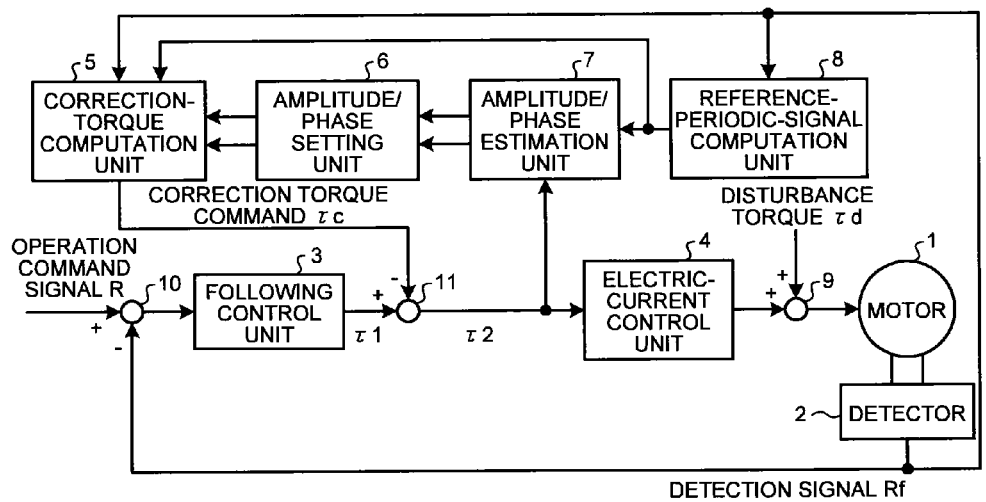
FIG. 1 is a block diagram of a motor control device according to a first embodiment of the present invention.

A motor control device according to a first embodiment of the present invention is described below with reference to FIGS. 1 to 7. FIG. 1 is a block diagram of the motor control device according to the first embodiment of the present invention. As shown in FIG. 1, an operation command signal R for commanding operations of a motor 1, such as a position command and a speed command, is input to the motor control device.

A detector 2 is connected to the motor 1, and detects a position and speed of the motor 1. The detector 2 then outputs a detection result as a detection signal Rf. A comparator 10 performs computations on a deviation between the operation command signal R and the detection signal Rf output from the detector 2. A following control unit 3 outputs a torque command by processing including proportional and integral computations, based on the deviation between the operation command signal R and the detection signal Rf that is given by the comparator 10. In the following control unit 3, a gain value used for the processing including the proportional and integral computations, and the like, have been set.

An electric-current control unit 4 outputs a drive current for driving the motor 1 based on the torque command input thereto. In this manner, a basic operation of the motor control device is to drive the motor 1 so as to follow the operation command signal R.

An adder 9 adds a disturbance torque τd to the control system described above. The disturbance torque τd expresses an influence of a torque ripple. Pulsation components occurring due to the configuration of the motor are usually generated inside the motor. In FIG. 1, while the disturbance torque τd is added on a side of the output of the electric-current control unit 4, it can be converted equivalently to be added to a side of the input of the electric-current control unit 4 when a response band of the electric-current control unit 4 is high enough to ignore the disturbance torque τd or when the electric-current control unit 4 and the motor 1 are handled as a control target in combination. In the present embodiment, for the brevity of explanations, it is assumed that the disturbance torque τd is added on the input side of the electric-current control unit 4.

An adder 11 adds a correction torque command τc to the output from the following control unit 3. The correction torque command τc is added to suppress the influence of the disturbance torque τd described above, and in FIG. 1 it is given a minus sign and then added by the adder 11. Therefore, when the correction torque command τc matches the disturbance torque τd, the disturbance torque τd is offset, thereby suppressing the torque ripple.

In the following explanations of the present embodiment and other embodiments, the torque command output from the following control unit 3 is referred to as "pre-correction torque command τ1", and a torque command obtained after the correction torque command τc is subtracted from τ1 in the adder 11 (that is, addition of τ1 and −τc), that is, the torque command input to the electric-current control unit 4 is referred to as "post-correction torque command τ2".

A reference-periodic-signal computation unit 8 calculates, by performing computations, a reference periodic signal having the same angular period as that of the torque ripple caused depending on the rotational position of the motor, based on the detection signal Rf output from the detector 2. An amplitude/phase estimation unit 7 sequentially estimates an amplitude and a phase of the post-correction torque command τ2 corresponding to the rotational position of the motor while the motor is driven, based on the post-correction torque command τ2 given by the adder 11 and the reference periodic signal output from the reference-periodic-signal computation unit 8. Detailed operations of the amplitude/phase estimation unit 7 are explained later.

An amplitude/phase setting unit 6 receives a result of the estimation of the amplitude and the phase estimated by the amplitude/phase estimation unit 7, then sets amplitude and phase setting values of the correction torque command τc based on the estimation result, and outputs them to a correction-torque computation unit 5.

The correction-torque computation unit 5 calculates and outputs the correction torque command τc dependent on the rotational position of the motor 1, based on the amplitude and the phase set by the amplitude/phase setting unit 6 and on the detection signal Rf output from the detector 2.

The correction torque command τc calculated by the correction-torque computation unit 5 is a periodically varying value having, for example, the same period as that of the reference periodic signal output from the reference-periodic-signal computation unit 8, that is, the same angular period as the torque ripple, and is dependent on a rotation angle of the motor 1. In this case, the correction-torque computation unit 5 can obtain the reference periodic signal having the same angular period as the torque ripple from the reference-periodic-signal computation unit 8, and also can generate it based on the detection signal Rf output from the detector 2.

Figure 2:
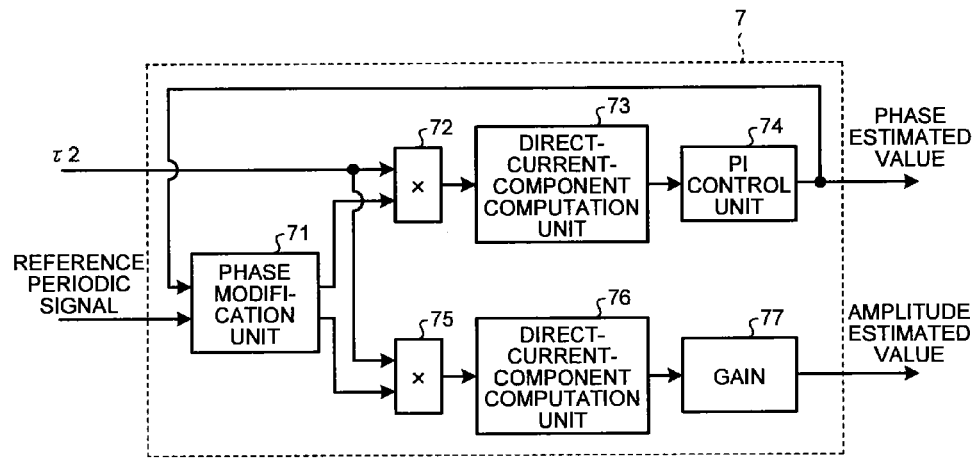
FIG. 2 is a block diagram of a configuration of an amplitude/phase estimation unit according to the first embodiment of the present invention.

Next, an estimating operation of the amplitude/phase estimation unit 7 is explained in detail with reference to FIG. 2. FIG. 2 is a block diagram of a configuration of the amplitude/phase estimation unit 7. In FIG. 2, it is first assumed that the post-correction torque command τ2, which is a signal as an estimating object, is a periodic signal represented by the following Equation (1) with the torque ripple.

$$\tau 2 = A \sin(\theta + \alpha) \qquad \text{Equation (1)}$$

In the Equation (1), a reference angle θ indicates periodic changes of the torque ripple caused depending on the rotational position of the motor, and can be determined from the position or speed of the motor when the number of times of the torque ripples caused by one rotation of the motor is known. Furthermore, when the motor is driven at a constant speed, θ=ωt can be expressed where ω denotes an angular frequency and t denotes time, and the post-correction torque command τ2 becomes a signal vibrating with a constant period. Moreover, values of an amplitude A and a phase α are parameters to be estimated.

A phase modification unit 71 outputs a periodic signal obtained after the phase of the reference periodic signal is modified based on the reference periodic signal having the same angular period as the torque ripple that is output from the reference-periodic-signal computation unit 8, for example, sin(θ), and also on the estimated value of the phase. When β denotes the estimated value of the phase, the periodic signal output from the phase modification unit 71 is given by the following Equations (2) and (3).

$$\cos(\theta + \beta) \qquad \text{Equation (2)}$$

$$\sin(\theta + \beta) \qquad \text{Equation (3)}$$

The post-correction torque command τ2 given by the Equation (1) and the reference periodic signal given by the Equation (2) are input to a multiplier 72, and then the multiplier 72 multiplies them. Accordingly, an output signal of the multiplier 72 is given by the following Equation (4).

$$\tau 2 \cdot \cos(\theta + \beta) = (A/2)(\sin(2\theta + \alpha + \beta) + \sin(\alpha - \beta)) \qquad \text{Equation (4)}$$

A direct-current-component computation unit 73 performs computations on (A/2)sin(α−β) that is the output signal from the multiplier 72 and is a direct-current component of the Equation (4), by using a low-pass filter, for example. A PI control unit 74 changes, based on α value of the direct-current component input thereto, the phase estimated value β so as to minimize the direct-current component. When the direct-current component is minimized, the phase α of the post-correction torque command τ2 and the phase estimated value β become equal to each other, so that the sequential estimation of the phase α can be realized.

The post-correction torque command τ2 given by the Equation (1) mentioned above and the reference periodic signal given by the Equation (3) are input to a multiplier 75, and then the multiplier 75 multiplies them. Accordingly, an output signal from the multiplier 75 is given by the following Equation (5).

$$\tau 2 \cdot \sin(\theta + \beta) = -(A/2)(\cos(2\theta + \alpha + \beta) - \cos(\alpha - \beta)) \qquad \text{Equation (5)}$$

A direct-current-component computation unit 76 performs computations on (A/2)cos(α−β) that is the output signal from the multiplier 75 and is a direct-current component of the Equation (5), by using a low-pass filter, for example. A value of the direct-current component becomes A/2 when the phase α of the post-correction torque command τ2 and the phase estimated value β are equal to each other.

A gain 77 amplifies the direct-current component input from the direct-current-component computation unit 76, and outputs an amplitude estimated value. As described above, the sequential estimation of the amplitude of the periodic signal dependent on the rotational position of the motor can be realized according to the estimation of the phase estimated value β.

Figure 3:
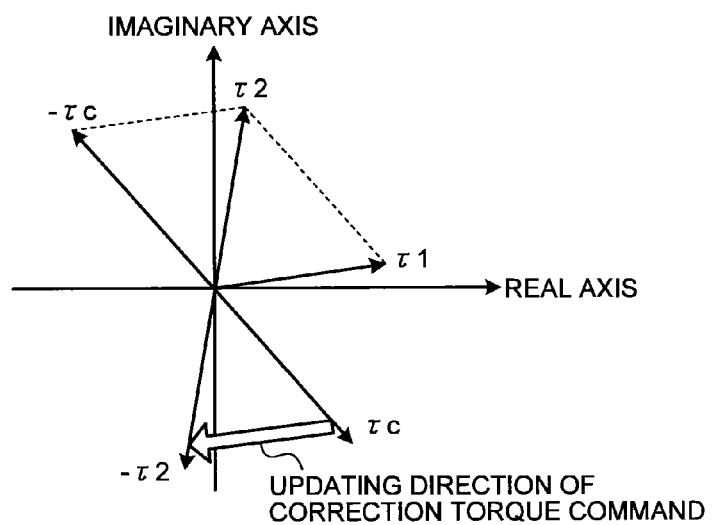
FIG. 3 is a vector diagram of an operation of estimating a correction torque command according to the first embodiment of the present invention.

Next, an operation of estimating the correction torque command τc is described in detail with reference to FIG. 3. FIG. 3 is a vector diagram of an operation of estimating the correction torque command. In FIG. 3, information on the amplitude and the phase of each torque signal at a frequency at which a torque ripple is caused is shown by vectors on a complex plane.

As shown in FIG. 1, the post-correction torque command τ2 is determined by subtracting the correction torque command τc from the pre-correction torque command τ1, so that a relation among τ1, −τc, and τ2 can be represented as a composition of vectors, as indicated by dotted lines in FIG. 3.

When the influence of the torque ripple is being suppressed ideally, the amplitude of the pre-correction torque command τ1 becomes 0, and therefore −τc and τ2 match each other. In consideration of this point, as an error relative to an ideally suppressed state, a difference between −τc and τ2 is used as the amount of updating the correction torque command τc. This update process is equivalent to updating the correction torque command τc to −τ2, by determining the amplitude and the phase of the post-correction torque command τ2 in the amplitude/phase estimation unit 7.

Figure 4:
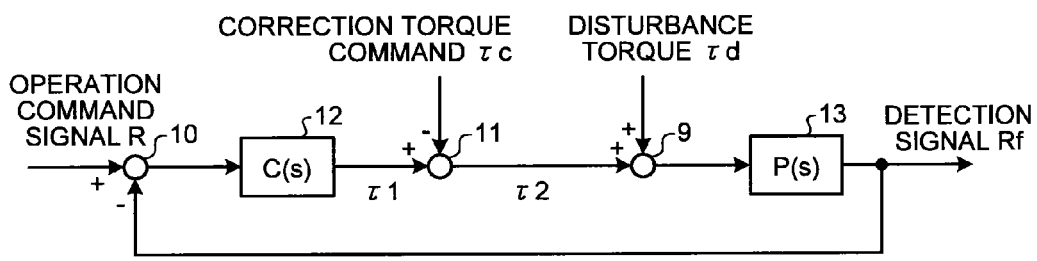
FIG. 4 is a block diagram of a configuration of a control system according to the first embodiment of the present invention.

Next, a convergence of τc onto τd that is achieved by a method of calculating the correction torque command τc according to the present embodiment is described with reference to FIG. 4. FIG. 4 is a block diagram of a configuration of the control system corresponding to FIG. 1 with transfer functions.

The configuration in FIG. 4 has a general feedback control system, and a transfer function of a controller 12 corresponding to the following control unit 3 is represented as C(s), and a transfer function of a control system 13 including the electric-current control unit 4, the motor 1, and the detector 2 is represented as P(s). Apart from the above elements, constituent elements identical to those shown in FIG. 1 are denoted by like reference signs, and explanations thereof will be omitted.

In the control system shown in FIG. 4, a sensitivity function S and a complementary sensitivity function T are given by the following Equations (6) and (7), respectively.

$$S=1/(1+CP) \quad \text{Equation (6)}$$

$$T=CP/(1+CP) \quad \text{Equation (7)}$$

When the post-correction torque command τ2 is described using the sensitivity function S and the complementary sensitivity function T by focusing only on a frequency component of the torque ripple, the post-correction torque command τ2 is given by the following Equation (8) using the correction torque command τc and the disturbance torque τd.

$$\tau 2 = -S\tau c - T\tau d \quad \text{Equation (8)}$$

Next, because the correction torque command τc is updated to −τ2 in the present embodiment as described earlier, −τ2 given by the Equation (8) is used as τc. When τ2 given by the Equation (8) is that determined by an arbitrary $k^{th}$ time of updating, the post-correction torque command τ2(k+1) at the $k+1^{th}$ time is given by the following Equation (9).

$$\tau 2(k+1)=-S(S\tau c(k)+T\tau d)-T\tau d=-S(S\tau c(k)+T\tau d)-(1-S)\tau d \quad \text{Equation (9)}$$

Similarly, when the $k+2^{th}$ time of updating and the $k+3^{th}$ time of updating are performed, the post-correction torque command τ2(k+n) at the $k+n^{th}$ time is given by the following Equation (10).

$$\tau 2(k+n)=-S^n(S\tau c(k)+T\tau d)-(1-S^n)\tau d \quad \text{Equation (10)}$$

In the Equation (10), when the sensitivity function S at the frequency of the torque ripple is smaller than 1, $S^n$ converges onto 0 as the updating is repeated. Specifically, the post-correction torque command τ2 converges onto −τd, which means that the τc updated repetitively to −τ2 converges to the disturbance torque τd.

In this manner, it becomes possible to determine the correction torque command τc that suppresses the torque ripple. The sensitivity function S is generally smaller than 1 within a control band, and therefore the convergence is achieved when the frequency of the torque ripple is within the control band.

In the above explanations, it has been assumed that, in the process of updating the correction torque command τc to −τ2, the amplitude and the phase of the estimated −τ2 are used as they are as updated values of the amplitude and the phase of the correction torque command τc. However, a computation on an error is performed by comparing τc before the updating with −τ2, and then a product of this error multiplied by a learning gain is added to τc before the updating so as at least to minimize the error, by which the process of updating τc can be realized.

In the case of this configuration, the amount of updating the correction torque command τc can be set by the learning gain. Therefore, it is possible to prevent the correction torque command τc from changing suddenly. Further, also when there are variations in the amplitude and the phase in the torque ripple, an average value of the correction torque command τc can be determined.

As a result of performing the computation on the error between τc and −τ2 described above, when an absolute value or the like of the difference therebetween becomes equal to or smaller than a predetermined value, the updating of τc is determined to have been sufficiently performed for convergence of τc, and accordingly the update process can be stopped.

Figure 5:
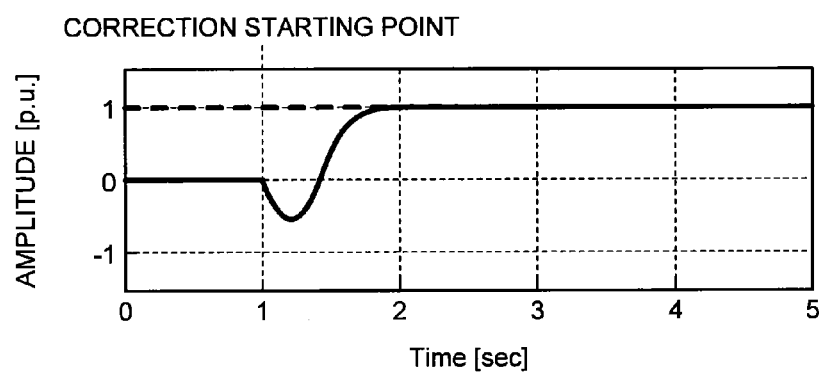
FIG. 5 is a waveform chart of a result of estimating an amplitude of the correction torque command according to the first embodiment of the present invention.
Figure 6:
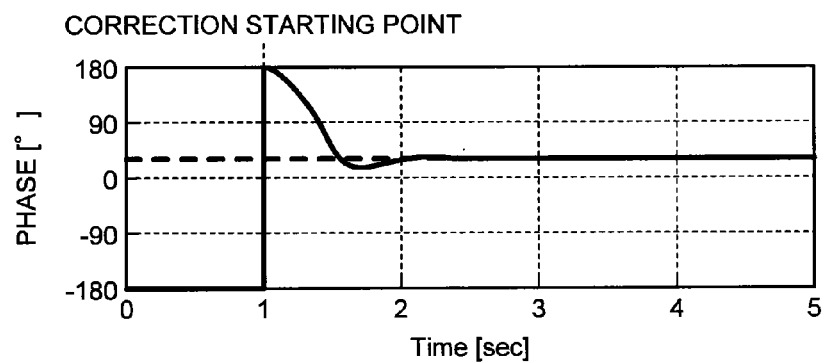
FIG. 6 is a waveform chart of a result of estimating a phase of the correction torque command according to the first embodiment of the present invention.
Figure 7:
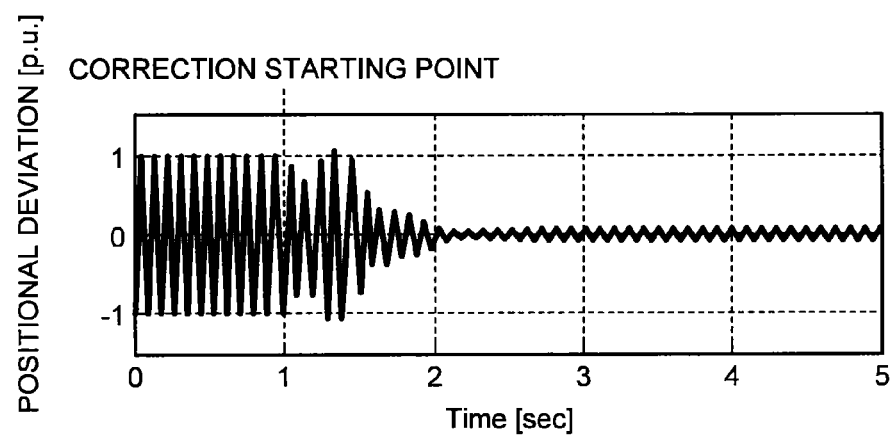
FIG. 7 is a waveform chart of a positional deviation depicting an operation of estimating the correction torque command according to the first embodiment of the present invention.

Next, the operation of estimating the correction torque command τc according to the present embodiment is described with reference to FIGS. 5 to 7. FIGS. 5 to 7 are waveform charts of an operation of estimating the correction torque command τc according to the present embodiment.

In FIGS. 5 to 7, a motor causing the torque ripples 30 [times] for one rotation of the motor is simulated, and a result of simulating the operation of estimating the correction torque command τc while the motor is being driven at a constant speed of 20 [r/min] is shown.

FIGS. 5 and 6 depict results of estimating the amplitude and the phase of the correction torque command τc, and the estimating operation is started from a point of time 1 [sec] that is a correction starting point. Furthermore, broken lines in FIGS. 5 and 6 respectively represent the amplitude and the phase of the torque ripple added as the disturbance torque, and matching of the amplitudes between the correction torque command τc and the disturbance torque τd and also matching of the phases therebetween can be confirmed as a result of the estimating operation. The amplitude of the disturbance torque τd is normalized to 1 [p.u.], and the phase of the same is 30 [°].

FIG. 7 depicts a correction effect of the estimating operation, in which it can be confirmed that a positional deviation during the rotation of the motor is reduced by the operation of estimating the correction torque command τc. The magnitude of a vibration component until 1 [sec] is normalized to 1 [p.u.].

As described above, in the motor control device according to the first embodiment of the present invention, the amplitude and the phase of the post-correction torque command τ2 corresponding to the rotational position of the motor 1 are estimated sequentially, and based on the estimation result, the amplitude and the phase of the correction torque command τc are updated respectively.

This enables sequential updating of the correction torque command τc that suppresses the torque ripple. That is, the sequential estimation eliminates the need of sampling, and the correction torque command τc suppressing cyclic vibrations caused by the torque ripple can be determined without requiring a large-scale memory by a simple process.

Second Embodiment

Figure 8:
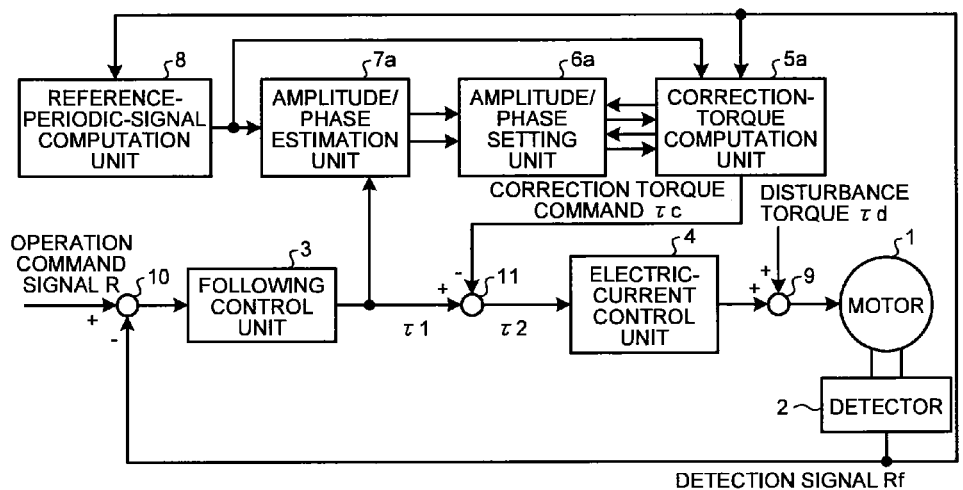
FIG. 8 is a block diagram of a motor control device according to a second embodiment of the present invention.

A motor control device according to a second embodiment of the present invention is described below with reference to FIG. 8. FIG. 8 is a block diagram of the motor control device according to the second embodiment of the present invention. In FIG. 8, like reference signs as those in FIG. 1 denote like constituent elements in FIG. 1, and explanations thereof will be omitted.

In FIG. 8, an amplitude/phase estimation unit 7a estimates the amplitude and the phase of the pre-correction torque command τ1 corresponding to the rotational position of the motor 1. While the configuration of the amplitude/phase estimation unit 7a is identical to that of the amplitude/phase estimation unit 7 shown in FIG. 2, the pre-correction torque command τ1 is input thereto instead of the post-correction torque command τ2. With this configuration, the amplitude and the phase of the pre-correction torque command τ1 are estimated using the reference periodic signal output from the reference-periodic-signal computation unit 8.

From a result of estimating the amplitude and the phase of the pre-correction torque command τ1 in the amplitude/phase estimation unit 7a and also from the amplitude and the phase of the correction torque command τc at the time of the estimation that have been set in a correction-torque computation unit 5a, an amplitude/phase setting unit 6a calculates setting values of the amplitude and the phase of new correction torque command τc, and outputs them to the correction-torque computation unit 5a.

The correction-torque computation unit 5a calculates the correction torque command τc dependent on the rotational position of the motor, based on the amplitude and the phase set by the amplitude/phase setting unit 6a and also on the detection signal Rf output from the detector 2, and then outputs the calculated correction torque command τc.

In this manner, in the present embodiment, the amplitude and the phase of the correction torque command τc are updated based on the estimated value of the pre-correction torque command τ1 and on the amplitude and the phase of the correction torque command τc at the time of the estimation.

Next, the operation of estimating the correction torque command τc is explained in detail with reference to FIG. 3. As described above, by updating the correction torque command τc to approach to −τ2, the torque ripple can be suppressed.

In the present embodiment, the amplitude and the phase of the pre-correction torque command τ1 are estimated, and the amplitude and the phase of the correction torque command τc at the time of the estimation are known, so that the amplitude and the phase of the post-correction torque command τ2 can be determined by performing a composite computation on the vectors shown in FIG. 3. Also in this case, it is obvious that the process of updating the correction torque command identical to that in the first embodiment τc can be realized.

Specifically, for example, the amplitude and the phase of −τ2 having a sign inverted from that of the post-correction torque command τ2 determined as described above can be used as they are, as the amplitude and the phase of the correction torque command τc after the updating, in the same manner as in the first embodiment. Alternatively, by adding a product of τ1 multiplied by the learning gain to τc before the updating so as to minimize the error between τc and −τ2, which is an absolute value of the estimated pre-correction torque command τ1, the process of updating τc can be performed. This prevents a sudden change in the correction torque command τc, in the same manner as described in the first embodiment.

As described above, in the motor control device according to the second embodiment of the present invention, the amplitude and the phase of the pre-correction torque command τ1 are estimated sequentially, and based on the estimation result and the amplitude and the phase of the correction torque command τc at the time of the estimation, the amplitude and the phase of the correction torque command τc are updated respectively.

Accordingly, the correction torque command τc that suppresses the torque ripple can be updated sequentially, so that it is possible to determine the correction torque command τc that suppresses the cyclic vibrations caused by the torque ripple in a short time by a simple process.

Third Embodiment

Figure 9:
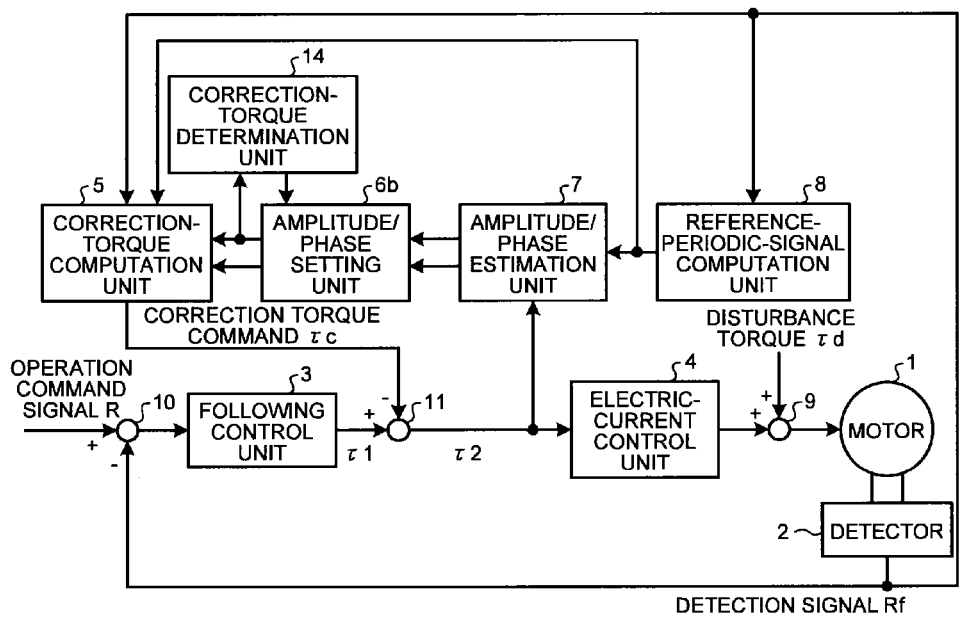
FIG. 9 is a block diagram of a motor control device according to a third embodiment of the present invention.

A motor control device according to a third embodiment of the present invention is explained below with reference to FIG. 9. FIG. 9 is a block diagram of the motor control device according to the third embodiment of the present invention. In FIG. 9, like reference signs as those in FIG. 1 denote like constituent elements in FIG. 1, and explanations thereof will be omitted.

In FIG. 9, a correction-torque determination unit 14 determines whether the amplitude of the correction torque command τc set by an amplitude/phase setting unit 6b is equal to or larger than a predetermined value set in advance, and then outputs a determination result to the amplitude/phase setting unit 6b.

When the correction-torque determination unit 14 determines that the amplitude of the correction torque command τc is equal to or larger than the predetermined value, the amplitude/phase setting unit 6b stops the operation of estimating the amplitude and the phase of the correction torque command τc, and then outputs a signal for stopping the correction using the correction torque command τc to the correction-torque computation unit 5. That is, the addition of the correction torque command τc to the pre-correction torque command τ1 is prevented.

Furthermore, operations as those described above can be also performed by providing the correction-torque determination unit 14 to the motor control device shown in FIG. 8 that estimates the amplitude and the phase of the pre-correction torque command τ1 and then updates the correction torque command τc.

Figure 10:
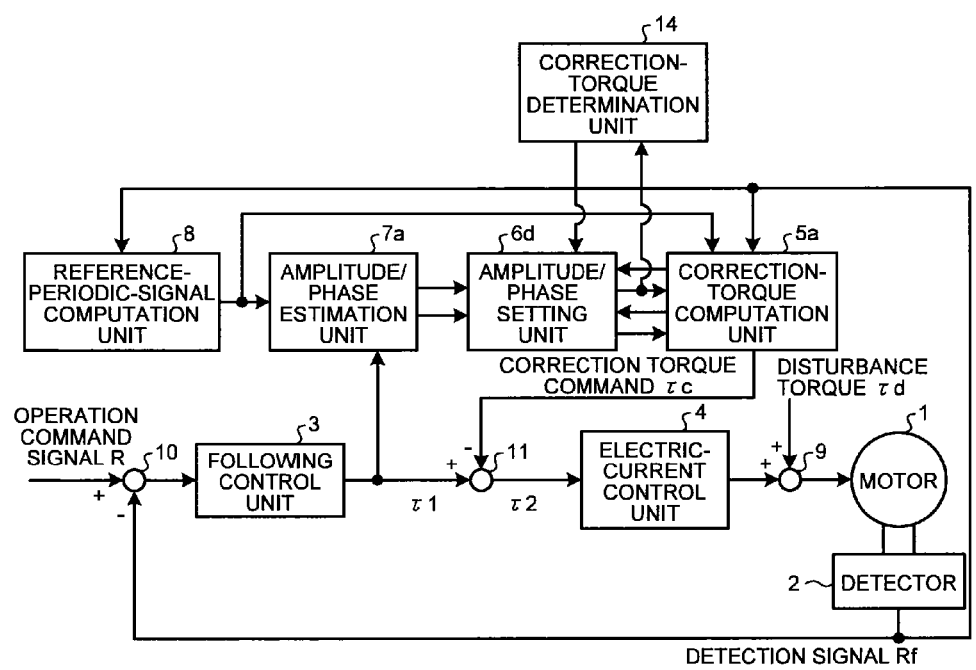
FIG. 10 is a block diagram of another motor control device according to the third embodiment of the present invention.

In this case, as shown in FIG. 10, the correction-torque determination unit 14 determines that the amplitude of the correction torque command τc set by a amplitude/phase setting unit 6d is equal to or larger than a predetermined value set in advance, and outputs a result of the determination to the amplitude/phase setting unit 6d. Subsequent operations of the amplitude/phase setting unit 6d are the same as those of the amplitude/phase setting unit 6b. In FIG. 10, like reference signs as those in FIG. 8 denote like constituent elements in FIG. 8, and explanations thereof will be omitted.

As described above, in the motor control device according to the third embodiment of the present invention, when the estimation operation is performed under conditions except for the convergence conditions (a case that the sensitivity function of the control system is smaller than 1) described in the first embodiment, it is possible to prevent the addition of excessive correction torque commands to the pre-correction torque command that occurs due to unstable estimating operations. Accordingly, stable estimating operations can be realized. That is, it is possible to prevent an erroneous operation of estimating the correction torque command depending on operating conditions.

Fourth Embodiment

Figure 11:
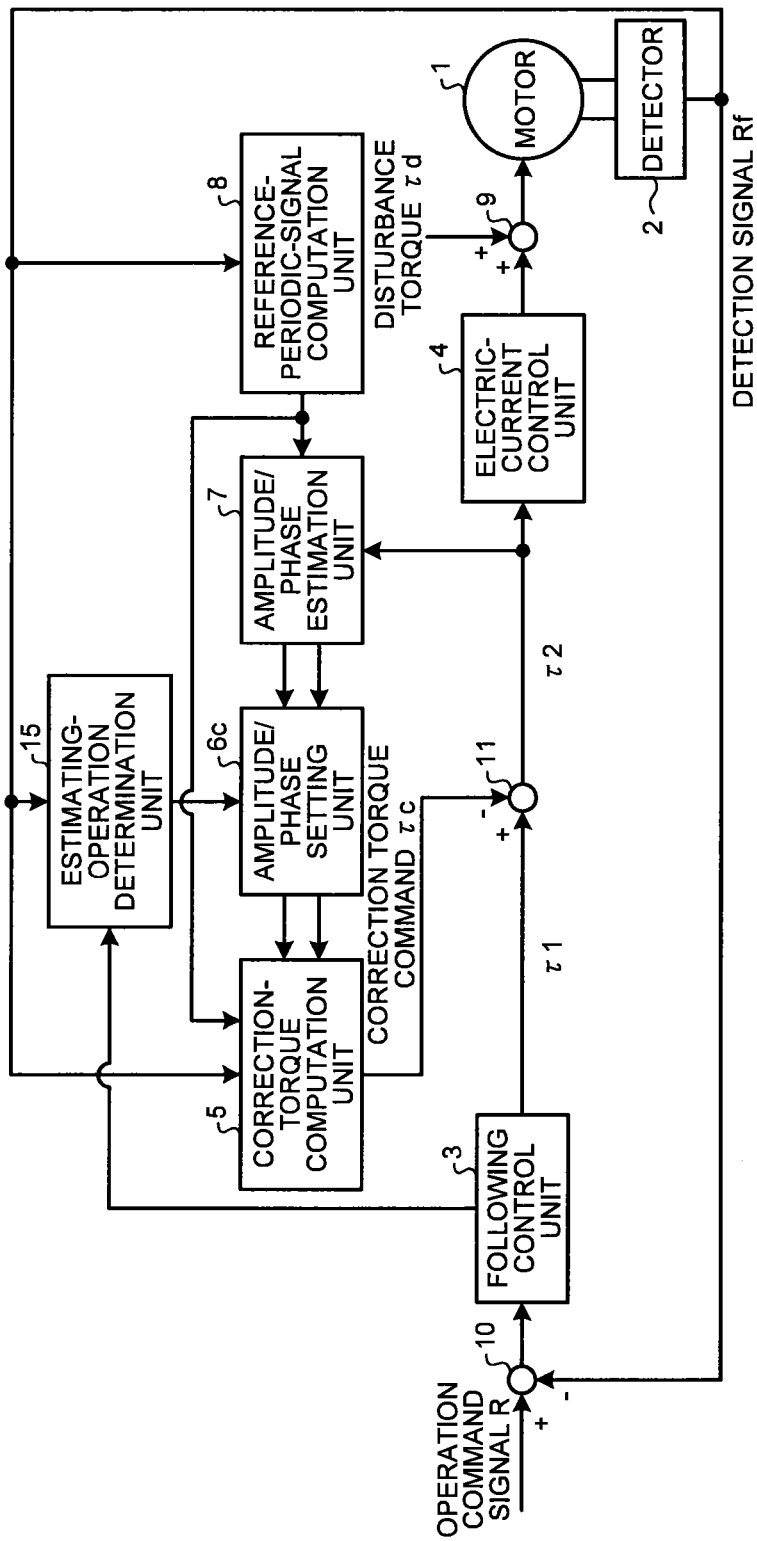
FIG. 11 is a block diagram of a motor control device according to a fourth embodiment of the present invention.

A motor control device according to a fourth embodiment of the present invention is explained below with reference to FIG. 11. FIG. 11 is a block diagram of the motor control device according to the fourth embodiment of the present invention. In FIG. 11, like reference signs as those in FIG. 1 denote like constituent elements in FIG. 1, and explanations thereof will be omitted.

In FIG. 11, an estimating-operation determination unit 15 determines, based on the gain value set by the following control unit 3 and on the detection signal Rf, whether a condition for the convergence of the operation of estimating the correction torque command τc is satisfied, and then outputs a result of the determination to an amplitude/phase setting unit 6c.

The condition for the convergence of the estimating operation is that the frequency of the torque ripple is within the control band, as described in the first embodiment. When the number of times of the torque ripples caused in one rotation of the motor is known, the frequency of the torque ripple can be determined from the position or speed of the motor. Furthermore, the control band is dependent on the gain value set in the following control unit 3. Accordingly, the estimating-operation determination unit 15 can determine whether the estimating operation converges, by comparing both the frequency and the gain value with each other.

When the estimating-operation determination unit 15 determines that the condition for the convergence of the operation of estimating the correction torque command τc is not satisfied, the amplitude/phase setting unit 6c fixes the setting value output to the correction-toque computation unit 5, and then stops the updating of the correction torque command τc.

Furthermore, operations as those described above can be also performed by providing the estimating-operation determination unit 15 to the motor control device shown in FIG. 8 that estimates the amplitude and the phase of the pre-correction torque command τ1 and then updates the correction torque command τc.

Figure 12:
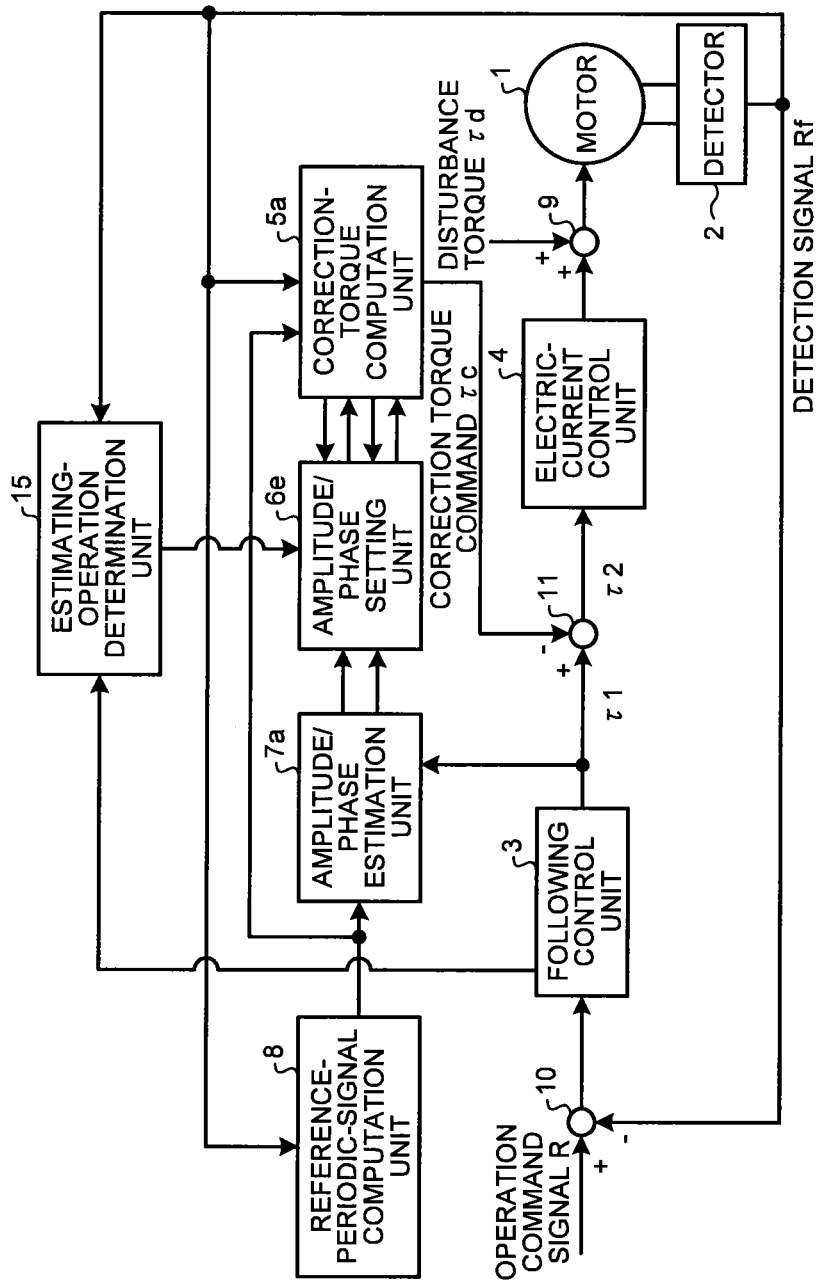
FIG. 12 is a block diagram of another motor control device according to the fourth embodiment of the present invention.

In this case, as shown in FIG. 12, when the estimating-operation determination unit 15 determines that the condition for the convergence of the operation of estimating the correction torque command τc is not satisfied, an amplitude/phase setting unit 6e fixes the setting value output to the correction-torque computation unit 5a, and then stops the updating of the correction torque command τc. In FIG. 12, like reference signs denote elements identical to those shown in FIG. 8, and explanations thereof will be omitted.

As described above, in the motor control device according to the fourth embodiment of the present invention, the estimating operation can be prevented under conditions except for the convergence condition (a case that the sensitivity function of the control system is smaller than 1) described in the first embodiment, thereby realizing the stable estimating operation.

Furthermore, according to the motor control device according to the fourth embodiment, the convergence condition can be distinguished automatically, and the estimating operation can be switchably performed and stopped, so that the updating of the correction torque command τc during the driving of the motor can be always performed. That is, by automatically distinguishing the condition that the estimation of the correction torque command is stably performed, the correction torque command can always become effective. Accordingly, it is also possible to handle a case that the characteristics of the torque ripple have changed, such as a change due to aged degradation.

As described above, the motor control device according to the present embodiment adopts a method of sequentially estimating an amplitude and a phase indicating the feature quantity of a pre-correction torque command or a post-correction torque command and learning a correction torque by using the estimation result, and is able to determine the amplitude and the phase at the same time by a simple process. Because parameters of the amplitude and the phase can be estimated at the same time by a simple process, only a short time is required for the estimation. Furthermore, the sequential processing eliminates the need of a memory, so that it is possible to always make the correction torque command effective.

The invention of the present application is not limited to the above embodiments, and when the present invention is carried out, it can be variously modified without departing from the scope thereof. In the above embodiments, inventions of various stages are included, and various inventions can be extracted by appropriately combining a plurality of constituent elements disclosed therein. For example, even when some constituent elements are omitted from all constituent elements described in the embodiments, as far as the problems mentioned in the section of Solution to Problem can be solved and effects mentioned in the section of Advantageous Effects of Invention are obtained, the configuration from which these constituent elements have been omitted can be extracted as an invention. Furthermore, constituent elements common to different embodiments can be appropriately combined.

Industrial Applicability

As described above, the motor control device according to the present invention is useful for controlling of a motor so as to suppress a torque ripple caused by the characteristics of the motor by a simple process in a short time with high accuracy, and is particularly suitable for a motor control device of a motor that drives an industrial machine.

Reference Signs List

1 MOTOR
2 DETECTOR
3 FOLLOWING CONTROL UNIT
4 ELECTRIC-CURRENT CONTROL UNIT
5, 5a CORRECTION-TORQUE COMPUTATION UNIT
6, 6a, 6b, 6c, 6d, 6e AMPLITUDE/PHASE SETTING UNIT
7, 7a AMPLITUDE/PHASE ESTIMATION UNIT
8 REFERENCE-PERIODIC-SIGNAL COMPUTATION UNIT
9, 11 ADDER
10 COMPARATOR
12 CONTROLLER
13 CONTROL SYSTEM
14 CORRECTION-TORQUE DETERMINATION UNIT
15 ESTIMATING-OPERATION DETERMINATION UNIT
71 PHASE MODIFICATION UNIT
72, 75 MULTIPLIER
73, 76 DIRECT-CURRENT-COMPONENT COMPUTATION UNIT
74 PI CONTROL UNIT
77 GAIN

The invention claimed is:

1. A motor control device comprising:
a following control unit that calculates a pre-correction torque command based on a difference between an operation command signal for commanding an operation of a motor and a detection signal that is a result of detecting an operation of the motor;
an adder that outputs a post-correction torque command by adding the pre-correction torque command to a correction torque command; and
an electric-current control unit that outputs a drive current for driving the motor based on the post-correction torque command, wherein
the motor control device executes control so that the detection signal matches the operation command signal, and wherein
the motor control device further comprises:
a reference-periodic-signal computation unit that calculates, based on the detection signal, a reference periodic signal with a period that is same as that of a torque ripple caused by the motor and that is dependent on a position of the motor
an amplitude/phase estimation unit that sequentially estimates an amplitude of the post-correction torque command and a phase of the post-correction torque command relative to the reference periodic signal based on the reference periodic signal and the post-correction torque command that is an output from the adder, and
a correction-torque computation unit that sequentially updates the correction torque command input to the adder so that a difference between the correction torque command input to the adder and the post-correction torque command output from the adder becomes small, by using an amplitude and a phase of the post-correction torque command that are estimated by the amplitude/phase estimation unit.

2. The motor control device according to claim 1, wherein the amplitude/phase estimation unit sequentially estimates an amplitude of the post-correction torque command and a phase of the post-correction torque command relative to the reference periodic signal based on a signal obtained by sequentially multiplying a periodic signal generated based on the reference periodic signal and the post-correction torque command that is an output from the adder.

3. The motor control device according to claim 1, further comprising a correction-torque determination unit that determines whether an amplitude of the correction torque command updated by the correction-torque computation unit is equal to or larger than a predetermined threshold, wherein
when the amplitude of the correction torque command is equal to or larger than the threshold, the correction-torque computation unit stops updating the correction torque command, and the adder does not add the correction torque command to the pre-correction torque command.

4. The motor control device according to claim 1, further comprising an estimating-operation determination unit that determines, based on a gain value set for the following control unit to calculate the pre-correction torque command and on a frequency of the torque ripple obtained from the detection signal, whether the frequency is within a control band, wherein
when the frequency exceeds the control band, the correction-torque computation unit does not update the correction torque command.

5. A motor control device comprising:
a following control unit that calculates a pre-correction torque command based on a difference between an operation command signal for commanding an operation of a motor and a detection signal that is a result of detecting an operation of the motor;
an adder that outputs a post-correction torque command by adding the pre-correction torque command to a correction torque command; and
an electric-current control unit that outputs a drive current for driving the motor based on the post-correction torque command, wherein
the motor control device executes control so that the detection signal matches the operation command signal, and wherein
the motor control device further comprises:
a reference-periodic-signal computation unit that calculates, based on the detection signal, a reference periodic signal with a period that is same as that of a torque ripple caused by the motor and that is dependent on a position of the motor;
an amplitude/phase estimation unit that sequentially estimates an amplitude of the pre-correction torque command and a phase of the pre-correction torque command relative to the reference periodic signal based on the reference periodic signal and the pre-correction torque command that is an output from the following control unit; and
a correction-torque computation unit that sequentially updates the correction torque command input to the adder so that a difference between the correction torque command input to the adder and the post-correction torque command output from the adder becomes small, by using an amplitude and a phase of the pre-correction torque command that are estimated by the amplitude/phase estimation unit.

6. The motor control device according to claim 5, further comprising a correction-torque determination unit that determines whether an amplitude of the correction torque command updated by the correction-torque computation unit is equal to or larger than a predetermined threshold, wherein
when the amplitude of the correction torque command is equal to or larger than the threshold, the correction-torque computation unit stops updating the correction torque command, and the adder does not add the correction torque command to the pre-correction torque command.

7. The motor control device according to claim 5, further comprising an estimating-operation determination unit that determines, based on a gain value set for the following control unit to calculate the pre-correction torque command and on a frequency of the torque ripple obtained from the detection signal, whether the frequency is within a control band, wherein
when the frequency exceeds the control band, the correction-torque computation unit does not update the correction torque command.

8. The motor control device according to claim 5, wherein the amplitude/phase estimation unit estimates an amplitude of the pre-correction torque command and a phase of the pre-correction torque command relative to the reference periodic signal based on a signal obtained by sequentially multiplying a periodic signal generated based on the reference periodic signal and the pre-correction torque command that is an output from the following control unit.

* * * * *